(12) United States Patent
Pastouret et al.

(10) Patent No.: US 8,958,674 B2
(45) Date of Patent: Feb. 17, 2015

(54) AMPLIFYING OPTICAL FIBER AND PRODUCTION METHOD

(75) Inventors: Alain Pastouret, Massy (FR); Cedric Gonnet, Paris (FR); Ekaterina Burov, Boulogne-Biliancourt (FR)

(73) Assignee: Draka Comteq, B.V., Amsterdam (NL)

( * ) Notice: Subject to any disclaimer, the term of this patent is extended or adjusted under 35 U.S.C. 154(b) by 1447 days.

(21) Appl. No.: 12/629,495

(22) Filed: Dec. 2, 2009

(65) Prior Publication Data

US 2010/0135627 A1 Jun. 3, 2010

Related U.S. Application Data

(60) Provisional application No. 61/119,970, filed on Dec. 4, 2008.

(30) Foreign Application Priority Data

Dec. 2, 2008 (FR) ..................................... 08 06752

(51) Int. Cl.
*G02B 6/02* (2006.01)
*H01S 3/067* (2006.01)
*H01S 3/16* (2006.01)
*H01S 3/17* (2006.01)

(52) U.S. Cl.
CPC ............ *H01S 3/06716* (2013.01); *H01S 3/1603* (2013.01); *H01S 3/169* (2013.01); *H01S 3/1691* (2013.01); *H01S 3/1695* (2013.01); *H01S 3/176* (2013.01)
USPC .......................................... 385/123; 385/125

(58) Field of Classification Search
USPC ................................................. 385/123–128
See application file for complete search history.

(56) References Cited

U.S. PATENT DOCUMENTS

| | | | |
|---|---|---|---|
| 4,838,643 | A | 6/1989 | Hodges et al. |
| 5,574,816 | A | 11/1996 | Yang et al. |

(Continued)

FOREIGN PATENT DOCUMENTS

| | | |
|---|---|---|
| EP | 1347545 A1 | 9/2003 |
| EP | 1921478 A1 | 5/2008 |

(Continued)

OTHER PUBLICATIONS

Jeon et al., Hydrothermal Synthesis of Er-Doped Luminescent TiO2 Nanoparticles, Jul. 18, 2002, 2003 American Chemical Society pp. 1256-1263.*

(Continued)

*Primary Examiner* — Tina M Wong
(74) *Attorney, Agent, or Firm* — Additon, Higgins & Pendleton, P.A.

(57) ABSTRACT

Disclosed is an amplifying optical fiber that includes a central core that is suitable for transmitting and amplifying an optical signal and a surrounding optical cladding that is suitable for confining the optical signal transmitted in the central core. The central core is formed from a main matrix that contains nanoparticles doped with at least one rare earth element. The weight concentration of the rare earth dopants in the nanoparticles is typically between about 1 and 20 percent, and the nanoparticle concentration in the central core's main matrix is between about 0.05 percent and 1 percent by volume. The disclosed optical fiber incorporates rare earth ions at high concentrations yet avoids the phenomenon of photodarkening at high transmission power.

20 Claims, 1 Drawing Sheet

(56) References Cited

U.S. PATENT DOCUMENTS

| | | |
|---|---|---|
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,031,590 B2 | 4/2006 | Gasca et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,724,998 B2 | 5/2010 | Parris et al. |
| 7,817,891 B2 | 10/2010 | Lavenne et al. |
| 2003/0053773 A1* | 3/2003 | Ainslie et al. ............ 385/123 |
| 2003/0180029 A1* | 9/2003 | Garito et al. ............ 385/142 |
| 2008/0292262 A1 | 11/2008 | Overton et al. |
| 2009/0116798 A1 | 5/2009 | Blanchandin et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142969 A1 | 6/2010 | Gholami et al. |

FOREIGN PATENT DOCUMENTS

| | | |
|---|---|---|
| EP | 2194620 A1 | 6/2010 |
| WO | 03/058776 A1 | 7/2003 |
| WO | 03/079070 A2 | 9/2003 |
| WO | 2007/020362 A2 | 2/2007 |
| WO | 2009/062131 A1 | 5/2009 |

OTHER PUBLICATIONS

Koponen et al., "Liekki White Paper Photodarkening: Understanding and Mitigating," Mar. 31, 2005, pp. 1-5 [Cited in French Search Report].

Dekker et al., "Stimulated emission and optical gain in LaF3: Nd nanoparticle-doped polymer-based waveguides," Applied Physics Letters, vol. 85, No. 25, The Netherlands, Dec. 20, 2004, pp. 1-4 [Cited in French Search Report].

Lopez-Luke et al., "Effect of the CTAB concentration on the upconversion emission of Zr02:Er3+ nanocrystals," Science Direct, Optical Material 29 (2006) pp. 31-37 [Cited in French Search Report].

Patra, "Study of photoluminescence properties of Er3+ ions in Si02—Ge02 and A12O3 nanoparticles," Science Direct, Solid State Communications 132, (2004) pp. 299-303 [Cited in French Search Report].

French Search Report in counterpart French Application No. 0806752 dated Mar. 10, 2009, pp. 1-4.

Wu et al., "Optical and fluorescent properties of Y203 sol-gel planar waveguides containing Tb3+ doped nanocrystals," Applied Physics A, vol, 87, (2007) pp. 697-704 [Cited in French Search Report].

Zhang et al., "Optical gain at 1535 nm in LaF3:Er, Yb nanoparticle-doped organic-inorganic hybrid material waveguide," Applied Physics Letters 91, 161109 (2007) pp. 1-3 [Cited in French Search Report].

European Search Report in counterpart European Application No. 09014861 dated Mar. 2, 2010, pp. 1-5.

U.S. Appl. No. 12/098,804 for a "Transmission Optical Fiber Having Large Effective Area," Sillard et al., filed May 6, 2009 [Cited in Specification].

* cited by examiner

AMPLIFYING OPTICAL FIBER AND PRODUCTION METHOD

CROSS REFERENCE TO PRIORITY APPLICATIONS

This application claims the benefit of pending French application Ser. No. 08/06752 for "Fibre Optique Amplificatrice et Procédé de Fabrication" (filed Dec. 2, 2008, at the French Patent Office), which is hereby incorporated by reference in its entirety.

This application further claims the benefit of commonly assigned U.S. Provisional Patent Application Ser. No. 61/119,970, for Fibre Optique Amplificatrice et Procédé de Fabrication (filed Dec. 4, 2008), which is hereby incorporated by reference in its entirety.

FIELD OF THE INVENTION

The present invention relates to optical fibers, particularly amplifying optical fibers for transmitting and amplifying optical signals. The amplifying fibers can be used, for example, as high-speed, transmission-line amplifiers or as lasers. The invention further relates to methods for producing such optical fibers.

BACKGROUND

Amplifying fibers, particularly optical fibers doped with rare earth elements may be used for numerous optical applications.

For example, erbium doping is used in long-distance optical telecommunication systems for amplifying transmitted optical signals. Such optical fibers are used in erbium-doped fiber amplifiers (i.e., EDFAs). Erbium-doped fiber amplifiers can have a central core composed of a silica matrix that includes doping elements, such as erbium at concentrations of about 250 ppm to 1000 ppm (0.025 to 0.1 weight percent), optionally combined with complementary doping elements that make it possible to improve amplification (e.g., alumina for broadening the gain bandwidth for wavelength dense multiplexing (WDM) applications).

Ytterbium doping is often used in optical fibers for powerful laser applications. The ytterbium concentrations in such optical fibers are high (e.g., several weight percent). Ytterbium can also be used in the erbium-doped fiber amplifiers to improve the effectiveness of absorption of the pump signal by the erbium.

Optical amplification in a rare-earth-doped optical fiber is achieved by injecting into the optical fiber a pump signal, which excites the rare earth ions (e.g., $Er^{3+}$ in EDFA). When a light signal passes through this portion of optical fiber, it de-energizes the ions by stimulated emission by producing a photon identical in all respects to the incident photon. The light signal is thus doubled. A portion of such an optical fiber in combination with a resonant cavity constituted by a system of mirrors, or Bragg gratings, forms an optical-fiber laser. The wavelength and power of the laser depend on the rare earth element used and its concentration.

For certain applications, it is desirable to obtain high powers at the amplifying fiber output. It is also increasingly desirable to reduce the size of optical systems, and so research is being carried out with respect to compact optical fibers. With respect to reduced-size optical fibers, it may be necessary to increase the concentration of rare earth dopants in the optical-fiber core to increase the amplification gain.

If the concentration of rare earth dopants in the optical-fiber core is significant, the formation of packets of ions in the silica matrix of the core is observed. These packets create doping inhomogeneities, which impair the effectiveness of the emission of each rare earth ion. This results in a limitation of the amplification gain due to the existence of certain concurrent de-energizing paths between adjacent ions (e.g., transfers of energy by cross reactions). Such ion clusters also accentuate the photon degradations that can occur in the core of the high-power optical fiber during the propagation of light signals in the optical fiber. In fact, the crystalline defects present in the silica matrix of the core can absorb the energy from the photons emitted by rare earth ions that are de-energized. This can create darkening points in the core, which give rise to additional losses. Defects in the silica core matrix in the vicinity of rare earth clusters promote the formation of darkening points, because such silica defects can readily absorb the energy (e.g., ultraviolet light) emitted by such rare earth clusters.

The publication of "*Liekki White Paper Photodarkening: Understanding and Mitigating*," Koponen et al., (March 2005), which is incorporated by reference, identifies the problem of the photodarkening of rare-earth-doped optical fibers. This publication correlates the problem of photodarkening with the formation of rare-earth-ion clusters in the core and proposes to limit the inhomogeneities by using a method of production by direct deposition of nanoparticles (NPs) by a so-called direct nanoparticle deposition (DND) process.

The production method described in this publication is an alternative to modified chemical vapor deposition (MCVD), which is often used for doping the optical-fiber core. This publication proposes a production method based on an outside vapor deposition (OVD) technique in which the formation of the silica and the doping are carried out simultaneously. Nanoparticles composed of a rare-earth-doped silica powder, optionally co-doped with other elements, are formed when the reagents are simultaneously injected into the flame of a torch, and then directly projected to form a rod of doped silica constituting the optical-fiber core. Such a production method, however, does not make it possible to preserve the structure of nanoparticles in the optical-fiber core. These nanoparticles are simply particles of doped silica, such as those obtained in a vapor deposition method, before being fused at high temperature in order to form the layers of glass that provide the primary preform. This publication observes that this outside vapor deposition technique makes it possible to obtain a better homogeneity of the rare earth dopants in the optical-fiber core compared with an MCVD impregnation technique.

Nonetheless, the rare earth ions can still be found close to crystal defects in the silica matrix of the optical-fiber core. Moreover, the appearance of darkening points in the optical-fiber core is not completely avoided when the optical fiber is used to transmit high-power optical signals and has a high concentration of rare earth dopants.

Rare earth dopants can be introduced into the optical-fiber core by incorporating nanoparticles doped with rare earth elements via MCVD. For example, (i) European Patent No. 1,347,545 and its counterpart U.S. Pat. No. 7,031,590 and (ii) International Publication No. 2007/020362 and its counterpart U.S. Patent Publication No. 2009/0116798, each of which is incorporated by reference, describe optical fibers having nanoparticles in the optical-fiber core. The disclosed nanoparticles include a rare earth doping element and at least one element that improves the amplification of the signal (e.g., aluminum, lanthanum, antimony, and bismuth). The characteristics of the nanoparticles (e.g., design, composition, size, concentration) and of the doping described in these patent-related documents do not ensure the reduction or elimination of photodarkening in the optical-fiber core for high concentrations of rare earth ions.

Therefore, there is a need for an amplifying optical fiber that is highly doped with rare earth elements and that allows the use of high optical powers without damaging the optical fiber.

SUMMARY

Accordingly, the present invention proposes incorporating into the core of an optical fiber a high concentration of rare earth dopants in the form of nanoparticles. Such nanoparticles include at least one rare earth element and a matrix, the chemical composition and structure of which are chosen to ensure the absence of clusters (or pairs) of rare earth ions, the absence of interaction between the rare earth ions, and the integrity of the nanoparticle during the production of the optical fiber by MCVD to form a barrier between the rare earth ions and the defects in the silica matrix.

It is thus possible to obtain an optical fiber according to the present invention in which the rare earth ions are incorporated at a high concentration in a homogeneous matrix, while being isolated from the defects in the core's silica matrix. The phenomenon of photodarkening, which damages the amplifying fibers used with high powers, is thus avoided and the efficiency of the amplification of the optical signal is improved.

Therefore, in one aspect, the invention embraces an optical fiber having (i) a central core that is suitable for transmitting and amplifying an optical signal and (ii) a surrounding optical cladding that is suitable for confining the optical signal transmitted in the core. The central core is formed by a main matrix that contains rare-earth-doped nanoparticles. The concentration of the rare earth dopants in the nanoparticles is typically between about 1 and 20 weight percent. The concentration of the nanoparticles in the central core's main matrix is between about 0.05 percent and 1 percent by volume (e.g., between 0.05 percent and 0.2 percent by volume).

In one exemplary embodiment, the nanoparticle matrix can include alumina ($Al_2O_3$) and/or phosphorus (P).

In another exemplary embodiment, the rare earth element includes erbium (Er), ytterbium (Yb), thulium (Tm), or a combination thereof.

In yet another exemplary embodiment, the main matrix forming the central core is silica-based.

In yet another exemplary embodiment, the concentration of the nanoparticles in the main matrix of the central core is (i) greater than $10^{17}$ $cm^{-3}$ ($NPs/cm^3$) for nanoparticles having a diameter of about five nanometers (i.e., particle size) and/or (ii) greater than $10^{16}$ $cm^{-3}$ ($NPs/cm^3$) for nanoparticles having a diameter of about ten nanometers (i.e., particle size).

In another aspect, the invention embraces an optical laser that includes at least a portion of an optical fiber according to the invention. In this regard, the optical laser possesses optical power of at least 10 watts (W) for a pulse of 100 nanoseconds (ns).

In another aspect, the invention embraces an optical amplifier that includes at least a portion of an optical fiber according to the invention. In this regard, the amplifier gain is at least about 20 dB for a length of optical fiber between one and three meters.

In yet another aspect, the invention embraces a method for producing an optical-fiber primary preform from which an optical fiber can be drawn. The resulting optical fiber has a central core suitable for transmitting and amplifying an optical signal, and an optical cladding surrounding the central core and suitable for confining the optical signal transmitted in the core.

An exemplary method includes (i) chemically synthesizing rare-earth-doped nanoparticles in which the weight concentration of rare earth dopants in the nanoparticles is between about 1 percent and 20 percent; (ii) dispersing the rare-earth-doped nanoparticles in an aqueous solution at a volumetric concentration of between about 0.05 percent and 1 percent; and impregnating the porous inner layer of a silica tube with the aqueous solution.

Thereafter, the silica tube is collapsed (e.g., via vitrification and contraction) to form an optical-fiber preform. In this regard, the silica tube's impregnated porous layer forms the core of the optical-fiber preform and, after drawing, the corresponding central core of the resulting optical fiber.

In one exemplary embodiment, the method further includes heat treating the silica tube's impregnated porous layer at a temperature above 1000° C. for at least one hour.

In another exemplary embodiment, the synthesis of the nanoparticles is carried out in such a way that the molar ratio of precursors of alumina salts to precursors of rare earth salts is between 10 and 300.

In yet another exemplary embodiment, the nanoparticles are dispersed in an aqueous solution such that the concentration of nanoparticles having a diameter of about five nanometers is greater than or equal to $10^{17}$ $cm^{-3}$ ($NPs/cm^3$) and/or the concentration of nanoparticles having a diameter of about ten nanometers is greater than or equal to $10^{16}$ $cm^{-3}$ ($NPs/cm^3$).

The foregoing illustrative summary, as well as other exemplary objectives and/or advantages of the invention, and the manner in which the same are accomplished, are further explained within the following detailed description and its accompanying drawings.

DETAILED DESCRIPTION

An optical fiber is conventionally composed of an optical core, which functions to transmit and optionally amplify an optical signal, and an optical cladding, which functions to confine the optical signal in the optical core. For this purpose, the respective refractive indices of the core $n_c$ and the cladding $n_g$ are such that $n_c > n_g$.

As used herein, the term "optical cladding" should be understood in contrast to the outer cladding, which corresponds to and is constituted by the outer surface of the optical-fiber primary preform.

Typically, the central core and the optical cladding are obtained by gas-phase deposition (e.g., CVD, OVD, VAD, etc.). In the case of a CVD method, the outer cladding is constituted by the deposition tube and optionally by refilling or sleeving. In general, the relatively less volatile elements (rare earths, aluminum, etc.) are incorporated by impregnation of a porous silica rod during a CVD operation to form the core of the primary preform.

Figure 1:
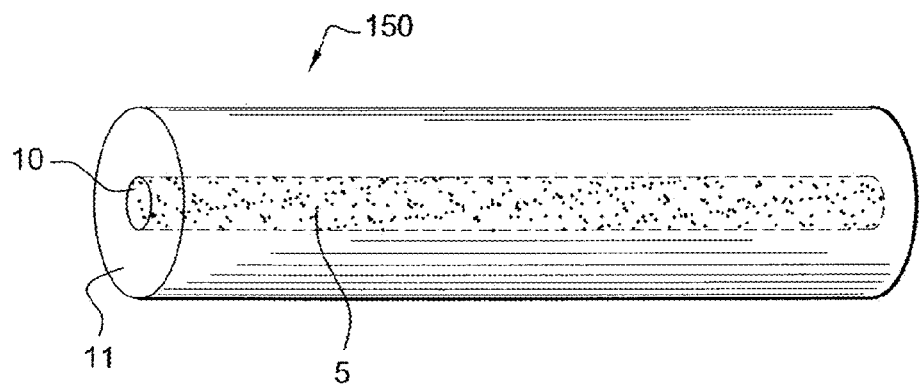
FIG. 1 schematically depicts an exemplary amplifying optical fiber according to the present invention.

FIG. 1 schematically depicts an exemplary optical fiber according to the present invention. In this regard, the optical fiber 150 includes (i) a central core 10 that is suitable for transmitting and amplifying an optical signal and (ii) an optical cladding 11 that surrounds the central core 10 and that is suitable for confining the optical signal transmitted in the central core 10. The central core 10 is formed by a main matrix (e.g., a silica matrix). The main matrix of the central core 10 can be pure silica, but more typically the central core 10 is silica doped with germanium, phosphorus, aluminum, or a combination of these elements, to ensure the refractive index profile (e.g., a step index profile) necessary for guiding the optical signal in the core. The optical cladding 11 can be either pure silica or doped silica.

The central core 10 contains nanoparticles 5 that are doped with rare earth ions. In this regard, the nanoparticle matrix possesses a composition and structure that encourages the solubilization of the rare earth ions and tolerates the conditions of optical-fiber production. This nanoparticle matrix can be separate from the main matrix of the central core 10.

The chemical composition and structure of the matrix of nanoparticles are typically chosen so as to ensure (i) the absence of clusters (or pairs) of rare earth ions; (ii) the absence of interaction between the rare earth ions and the nanoparticle matrix (e.g., defect, absorption, etc.); and (iii) the integrity of the nanoparticle during the production of the optical fiber by MCVD to form a barrier between the rare earth ions and defects in the silica matrix of the optical-fiber core.

The dispersion of rare earth doping ions within the nanoparticles is such that the minimal distance between rare earth ions is greater than the minimal distance at which two rare earth doping ions can be assimilated as a pair or a cluster. As disclosed in U.S. patent application Ser. No. 12/617,316 for an Amplifying Optical Fiber and Method of Manufacturing, filed Nov. 12, 2009, (Pastouret et al.), which is hereby incorporated by reference, assimilation leads to a concentration quenching phenomenon and a resulting decrease in amplification efficiency. Typically, the distance between two rare earth ions should be at least 0.4 nanometer (i.e., a minimal separation of four atoms). Assuming homogeneous ion dispersion, the concentration of rare earth ions within the nanoparticle matrix is less than about $10^{22}$ cm$^{-3}$ (i.e., less than about $10^{22}$ ions/cm$^3$).

The concentration of the rare earth dopants in each nanoparticle is typically between about 1 and 20 weight percent (e.g., 0.2 to 5 atom percent) according to the intended applications and the choice of rare earth element.

The concentration of the nanoparticles in the main matrix of the central core is typically between about 0.05 percent and 1 percent by volume, and more typically between about 0.05 percent and 0.2 percent by volume. If the concentration of the nanoparticles is less than 0.05 percent by volume, the optical fiber does not typically exhibit sufficient amplification. If the concentration of the nanoparticles is greater than 1 percent, a loss of amplification efficiency can occur because of the formation of ion pairs or clusters. Moreover, an elevated nanoparticle concentration tends to increase optical losses by diffusion.

By way of example, the concentration of the nanoparticles in the main matrix of the core is typically greater than $10^{17}$ cm$^{-3}$ (i.e., $10^{17}$ NPs/cm$^3$) for nanoparticles approximately five nanometers in diameter and typically greater than $10^{16}$ cm$^{-3}$ (i.e., $10^{16}$ NPs/cm$^3$) for nanoparticles approximately ten nanometers in diameter. The nanoparticle matrix allows a high concentration of rare earth ions with good dispersion. This makes it possible to obtain a highly doped, amplifying optical fiber having an increased amplification efficiency of the optical signal while avoiding the formation of ion clusters and the appearance of darkening points at high power.

The method of synthesis of the nanoparticles is chosen to reduce the formation of defects responsible for the appearance of darkening points at high power. Thus, it is preferable to use the methods of synthesis by soft chemistry, which promote the formation of thermodynamically stable stoichiometric structures. In contrast, physical methods that are governed by kinetics yield to structures formed out of equilibrium, which can lead to the formation of network defects.

For an erbium-doped, silica-based optical fiber, the energy transfer by cross reactions (i.e., de-energization between adjacent ions) can occur at relatively low ion concentrations, such as $10^{19}$ atoms/cm$^3$ (approximately 0.25 weight percent). This illustrates how silica matrices are generally unfavorable to the incorporation of rare earth elements.

Therefore, the composition of the nanoparticle matrix is chosen to encourage the dispersion and the solubility of the rare earth ions in order to incorporate rare earth ions at a high concentration without energy transfers between adjacent ions.

For example, alumina is known to allow the incorporation of rare earth ions at a high concentration (e.g., several weight percent or so). The concentration of the dopants in each nanoparticle can thus be significant (e.g., ten times more than the limit observed in a silica matrix) while remaining well dispersed. For nanoparticles of a given size and rare-earth-dopant concentration, the final concentration of rare earth ions in the optical-fiber core is determined (e.g., controlled) by the concentration of nanoparticles incorporated into the silica tube and its resulting optical-fiber preform.

The rare earth elements used within the framework of the present invention can be, for example, erbium, ytterbium, thulium, or a combination thereof, and/or any other rare earth element that permits amplification by optical pumping over a given spectral window.

The nanoparticle matrix can be, for example, alumina ($Al_2O_3$). Aluminum provides good distribution of the rare earth dopants in the nanoparticle and makes it possible to broaden the amplification gain in the spectral window for WDM applications. The nanoparticle matrix can also be composed of an oxide other than alumina, provided that this matrix allows the dissolution of a high concentration of rare earth ions and makes it possible to maintain a physical barrier between the rare earth dopants and the crystal defects in the main matrix of the optical-fiber core. The nanoparticle matrix does not lead to defects that are detrimental to the efficiency of transmission as a function of the time of use.

The nanoparticle matrix can also contain phosphorus, such as in the case of erbium/ytterbium (Er/Yb) co-doping, in order to encourage the efficiency of absorption of erbium by transfer of energy from ytterbium to erbium.

Figure 2:
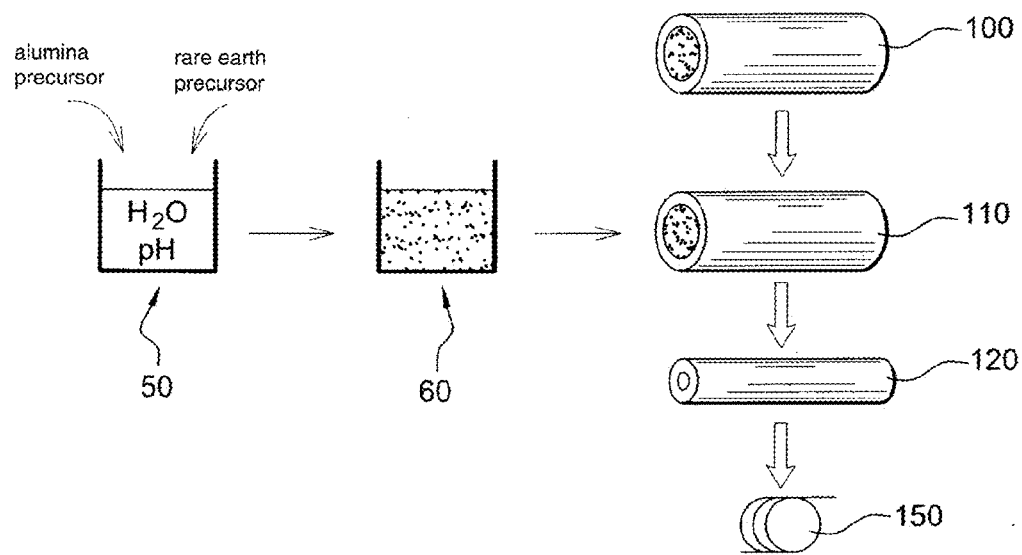
FIG. 2 schematically depicts the steps in an exemplary method for producing an optical-fiber preform and corresponding amplifying optical fiber according to the present invention.

FIG. 2 schematically depicts an exemplary method for making an optical-fiber preform and an amplifying optical fiber according to the present invention.

The nanoparticles can be produced by chemical or physical synthesis. As noted, chemical synthesis, which encourages the formation of thermodynamically stable stoichiometric structures, is preferred. A so-called "sol-gel" standard method can be used to chemically synthesize nanoparticles in an aqueous solution 50 at a controlled pH by co-precipitation of precursors of alumina salts and rare earth salts. For example, inorganic salts, such as nitrate or chloride, can be used as precursors of alumina, and inorganic salts (e.g., nitrate or chloride) or organic salts (e.g., acetyl acetonate or acetate) can be used as precursors of erbium, ytterbium, or thulium. The molar ratio of the precursors of alumina salts and rare earth salts is typically between 10 and 300 to yield a concentration of the rare earth dopants in each nanoparticle of between about 1 and 20 weight percent. The particular concentration depends on the intended applications and the choice of the earth element.

The nanoparticles are then washed and dispersed in an aqueous or alcoholic solution 60 at a nanoparticle concentration of between about 0.05 percent and 1 percent by volume, typically between 0.05 percent and 0.2 percent by volume. For example, the nanoparticles are dispersed in the aqueous or alcoholic solution 60 with a concentration of nanoparticles greater than or equal to $10^{17}$ cm$^{-3}$ for nanoparticles about five nanometers in diameter and greater than or equal to $10^{16}$ cm$^{-3}$ for nanoparticles about ten nanometers in diameter.

A silica tube 100 having a porous inner layer and cladding formed by a silica tube is produced by MCVD. The solution 60 of nanoparticles in stable suspension is then used to impregnate 110 the silica tube's porous inner layer during an MCVD operation. In this regard, the silica tube's impregnated porous layer eventually forms the doped core of the primary preform. The volumetric concentration of the nanoparticles in suspension in solution 60 and the volumetric concentration of the nanoparticles in the matrix of the optical-fiber core are substantially the same, because the solvent of the solution 60 is almost completely eliminated during the production of the optical-fiber preform 120.

The matrix of each nanoparticle must be preserved in the resulting optical fiber and must be able to constitute a physical barrier between the rare earth ions and the crystal defects of the silica matrix of the optical-fiber core. Therefore, it is important that the nanoparticle matrix be capable of resisting harsh conditions (e.g., temperature and stress) during production of the optical fiber.

For certain matrices, a step of thermal densification of the nanoparticles can be provided, after their impregnation into the silica tube's porous inner layer. The substrate tube can thus be subjected to heat treatment at a temperature above 1000° C. for at least one hour in order to reinforce the structure of the nanoparticles (i.e., in the silica tube's impregnated porous layer).

This heat treatment is then followed by a vitrification and contraction operation 120 in order to obtain the primary preform, and then by a refilling operation in order to form an optical-fiber preform, which can be used in a fiber-drawing tower to yield an optical fiber 150.

Example 1

Production of an Optical Fiber for a Pulsed Laser

The chemical synthesis of nanoparticles of ytterbium-doped alumina is performed. The size of the nanoparticles is approximately five nanometers. Precursors of alumina salts and of ytterbium salts are co-precipitated in an aqueous solution at a controlled pH (e.g., final pH of 4). The molar ratio of the precursors of alumina salts and ytterbium salts is approximately 20 to guarantee good dispersion of the ytterbium ions in the alumina matrix. It is thus possible to ensure sufficient separation between two ytterbium ions in each nanoparticle to avoid the formation of clusters.

An aqueous solution of these nanoparticles is prepared with a concentration of approximately $8 \times 10^{17}$ cm$^{-3}$ (i.e., NPs/cm$^{-3}$). This solution is then used to impregnate the porous inner layer of a silica tube by an MCVD technique. The silica tube's impregnated porous layer is then heat treated at a temperature greater than 1000° C. for at least one hour to reinforce the structure of the nanoparticles. The primary preform is then subjected to vitrification and collapsing operations, and then refilling in order to form a final optical-fiber preform.

The optical-fiber preform can be used to draw (i.e., in a fiber-drawing tower) an ytterbium-doped optical fiber. In this regard, the ytterbium concentration in the optical fiber's central core is between about 2 and 3 weight percent, with neither the formation of packets of ions nor the appearance of darkening points when the optical fiber is used with high optical powers. Such an optical fiber can be used as a pulsed laser with an output optical power greater than or equal to ten watts for a pulse of 100 nanoseconds (ns).

Example 2

Production of an Optical Fiber for a Compact Amplifier

The chemical synthesis of nanoparticles of erbium-doped alumina is performed. The size of the nanoparticles is approximately ten nanometers.

Precursors of alumina salts and of erbium salts are co-precipitated in an aqueous solution with a controlled pH (final pH of 9). The molar ratio of the precursors of alumina salts and erbium salts is approximately 200 to guarantee good dispersion of the erbium ions in the alumina matrix and to ensure a high concentration of aluminum close to each erbium ion that is capable of broadening the erbium gain band. Sufficient spacing (e.g., a minimum distance) between two erbium ions can be ensured in each nanoparticle to avoid the formation of clusters.

An aqueous solution of these nanoparticles is prepared with a concentration of approximately $2 \times 10^{17}$ cm$^{-3}$ (i.e., NPs/cm$^3$). This solution is then used to impregnate the porous inner layer of a silica tube by an MCVD technique. The silica tube's impregnated porous layer is then heat treated at a temperature greater than 1000° C. for at least one hour to reinforce the structure of the nanoparticles. The primary preform is then subjected to vitrification and collapsing operations, and then refilling in order to form a final optical-fiber preform.

The optical-fiber preform can be used to draw (i.e., in a fiber-drawing tower) an erbium-doped optical fiber. In this regard, the erbium concentration in the optical fiber's central core is about 0.2 weight percent, with neither the formation of packets of ions nor the appearance of darkening points when the optical fiber is used with high optical powers. Such an optical fiber can be used in a compact amplifier with an output optical power greater than or equal to 20 dB for two to three meters of fiber in the optical transmission band C.

Examples 1-2 (above) are not intended to limit the possible applications of the present invention. In particular, an optical amplifier can be produced with nanoparticles having a matrix other than alumina and doped with rare earth elements other than erbium. The amplifying fiber gain will depend on the concentration and kind of rare earth element used as a dopant. Similarly, an optical laser can be produced with nanoparticles having a matrix other than alumina and doped with rare earth elements other than ytterbium. The power of the laser will depend on the concentration and kind of rare earth element used as a dopant.

This application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.);

U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); and U.S. patent application Ser. No. 12/617,316 for an Amplifying Optical Fiber and Method of Manufacturing, filed Nov. 12, 2009, (Pastouret et al.).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical prop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber prop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat prop Cable, filed Nov. 9, 2009, (Overton et al.); U.S. patent application Ser. No.

12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); and U.S. patent application Ser. No. 12/615,737 for a Reduced-Diameter, Easy-Access Loose Tube Cable, filed Nov. 10, 2009, (Overton).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical fiber, comprising:
a central core comprising a main matrix; and
an optical cladding surrounding said central core;
wherein said central core's main matrix comprises nanoparticles, said nanoparticles comprising a nanoparticle matrix that includes at least one rare earth element;
wherein the volumetric concentration of said nanoparticles in said central core's main matrix is between about 0.05 percent and 1 percent;
wherein the weight concentration of said at least one rare earth element in said nanoparticles is between about 1 percent and 20 percent;
wherein, with respect to nanoparticles having a particle size of about five nanometers, the nanoparticle concentration in said central core is at least $10^{17}$ cm$^{-3}$; and
wherein, with respect to nanoparticles having a particle size of about ten nanometers, the nanoparticle concentration in said central core is at least $10^{16}$ cm$^{-3}$.

2. The optical fiber according to claim 1, wherein the volumetric concentration of said nanoparticles in said central core's main matrix is less than about 0.2 percent.

3. The optical fiber according to claim 1, wherein said central core's main matrix comprises silica.

4. The optical fiber according to claim 1, wherein said nanoparticle matrix comprises alumina ($Al_2O_3$).

5. The optical fiber according to claim 1, wherein said nanoparticle matrix comprises phosphorus (P).

6. The optical fiber according to claim 1, wherein said at least one rare earth element comprises erbium, ytterbium, and/or thulium.

7. An optical laser comprising at least a portion of the optical fiber according to claim 1, wherein the optical laser has optical power of at least about 10 W for a pulse of 100 nanoseconds (ns).

8. An optical amplifier comprising at least a portion of the optical fiber according to claim 1, wherein the gain of the optical amplifier is at least about 20 dB for a length of optical fiber between one and three meters.

9. An amplifying optical fiber, comprising:
a central core for transmitting and amplifying optical signals, said central core comprising nanoparticles that are doped with one or more rare earth elements; and
an optical cladding for confining optical signals transmitted in said central core, said optical cladding surrounding said central core;
wherein the volumetric concentration of said nanoparticles in said central core is between about 0.05 percent and 1 percent;
wherein the weight concentration of said one or more rare earth elements in said nanoparticles is between about 1 percent and 20 percent;
wherein, with respect to nanoparticles having a particle size of about five nanometers, the nanoparticle concentration in said central core is at least $10^{17}$ cm$^{-3}$; and
wherein, with respect to nanoparticles having a particle size of about ten nanometers, the nanoparticle concentration in said central core is at least $10^{16}$ cm$^{-3}$.

10. The optical fiber according to claim 9, wherein said nanoparticles comprise alumina ($Al_2O_3$) and/or phosphorus.

11. The optical fiber according to claim 9, wherein said nanoparticles are doped with erbium, ytterbium, and/or thulium.

12. The optical fiber according to claim 9, wherein the transmission of high-powered optical signals causes insubstantial photodarkening, if any.

13. A method for making an optical-fiber preform having a central core and a surrounding optical cladding, the method comprising:
chemically synthesizing rare-earth-doped nanoparticles in which the weight concentration of rare earth dopants in the nanoparticles is between about 1 percent and 20 percent;
dispersing the rare-earth-doped nanoparticles in an aqueous solution at a volumetric concentration of between about 0.05 percent and 1 percent; and
impregnating the porous inner layer of a silica tube with the aqueous solution.

14. A method according to claim 13, comprising, after the step of impregnating the silica tube's porous inner layer, contracting the silica tube to form the optical-fiber preform.

15. A method according to claim 13, comprising, after the step of impregnating the silica tube's porous inner layer, heat treating the silica tube's impregnated porous layer at a temperature above 1000° C. for at least one hour.

16. A method according to claim 13, wherein the step of chemically synthesizing rare-earth-doped nanoparticles is performed using a molar ratio of precursors of alumina salts to precursors of rare-earth-element salts of between about 10 and 300.

17. A method according to claim 13, wherein the step of dispersing the rare-earth-doped nanoparticles in an aqueous solution comprises dispersing the rare-earth-doped nanoparticles in the aqueous solution at a volumetric concentration of between about 0.05 percent and 0.2 percent.

18. A method according to claim 13, wherein the step of dispersing the rare-earth-doped nanoparticles in an aqueous solution comprises dispersing the rare-earth-doped nanoparticles in the aqueous solution such that the concentration of nanoparticles having a diameter of about five nanometers is greater than or equal to $10^{17}$ cm$^{-3}$.

19. A method according to claim 13, wherein the step of dispersing the rare-earth-doped nanoparticles in an aqueous solution comprises dispersing the rare-earth-doped nanoparticles in the aqueous solution such that the concentration of nanoparticles having a diameter of about ten nanometers is greater than or equal to $10^{16}$ cm$^{-3}$.

20. A method according to claim 13, wherein the step of dispersing the rare-earth-doped nanoparticles in an aqueous solution comprises dispersing the rare-earth-doped nanoparticles in the aqueous solution such that (i) the concentration of nanoparticles having a diameter of about five nanometers is greater than or equal to $10^{17}$ cm$^{-3}$ and (ii) the concentration of nanoparticles having a diameter of about ten nanometers is greater than or equal to $10^{16}$ cm$^{-3}$.

* * * * *